US012698681B2

(12) United States Patent
King et al.

(10) Patent No.: US 12,698,681 B2
(45) Date of Patent: Aug. 4, 2026

(54) COILED TUBING WELD-ON CONNECTOR

(71) Applicant: NATIONAL OILWELL VARCO, L.P., Houston, TX (US)

(72) Inventors: John M. King, Shenandoah, TX (US); James R. Streater, Jr., Humble, TX (US); Michael Rossing, Magnolia, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 9 days.

(21) Appl. No.: 18/469,700

(22) Filed: Sep. 19, 2023

(65) Prior Publication Data

US 2024/0117908 A1 Apr. 11, 2024

Related U.S. Application Data

(60) Provisional application No. 63/379,083, filed on Oct. 11, 2022.

(51) Int. Cl.
*E21B 17/04* (2006.01)
*E21B 17/02* (2006.01)
*F16L 13/02* (2006.01)

(52) U.S. Cl.
CPC ............ *E21B 17/041* (2020.05); *E21B 17/02* (2013.01); *F16L 13/0209* (2013.01)

(58) Field of Classification Search
CPC ..... E21B 17/041; E21B 17/02; F16L 13/0209
See application file for complete search history.

(56) References Cited

U.S. PATENT DOCUMENTS

| | | | | |
|---|---|---|---|---|
| 5,238,273 A | * | 8/1993 | Laflin | E21B 17/20 |
| | | | | 285/119 |
| 5,306,050 A | * | 4/1994 | Laflin | F16L 37/0847 |
| | | | | 285/119 |
| 2004/0084191 A1 | * | 5/2004 | Laird | E21B 31/20 |
| | | | | 166/242.6 |
| 2006/0243453 A1 | * | 11/2006 | McKee | E21B 19/16 |
| | | | | 166/242.6 |
| 2008/0047716 A1 | * | 2/2008 | McKee | E21B 17/046 |
| | | | | 166/242.6 |
| 2013/0076025 A1 | * | 3/2013 | Gipson | E21B 17/041 |
| | | | | 137/15.01 |
| 2014/0353533 A1 | * | 12/2014 | Guse, Jr. | H01F 7/081 |
| | | | | 251/129.15 |
| 2020/0115966 A1 | * | 4/2020 | Alexander | E21B 17/041 |
| 2022/0243539 A1 | * | 8/2022 | LaPlante | F16L 37/091 |
| 2022/0389772 A1 | * | 12/2022 | Miller | F16L 13/0209 |

OTHER PUBLICATIONS

"Saudi Arabian Application Serial No. 123450497, Response filed Jul. 27, 2025 to Substantive Examination Report mailed Apr. 24, 2025", w English claims, 34 pgs.

* cited by examiner

*Primary Examiner* — Neel Girish Patel
(74) *Attorney, Agent, or Firm* — Schwegman Lundberg & Woessner, P.A.

(57) ABSTRACT

A connector for coiled tubing may include a main body configured for welding to a free end of the coiled tubing and having an internal stem extending distally therefrom. The stem may include a sleeve portion and the connector may include an alignment sleeve arranged on the sleeve portion of the stem and being free to rotate relative to the stem. The alignment sleeve may have a longitudinally extending groove on an outside surface thereof for receiving a longitudinal weld bead on an inside surface of the coiled tubing.

19 Claims, 5 Drawing Sheets

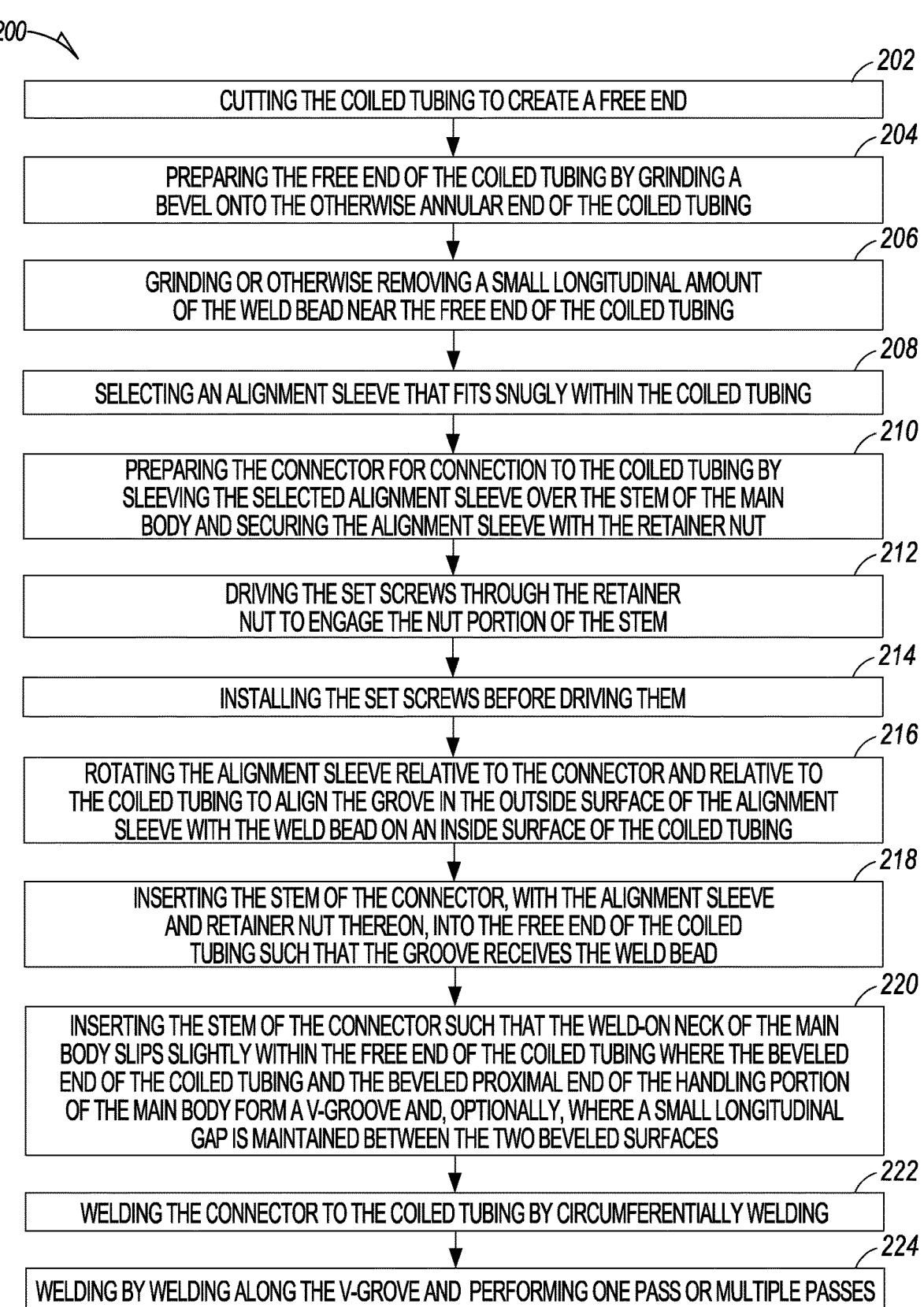

200

202
CUTTING THE COILED TUBING TO CREATE A FREE END

204
PREPARING THE FREE END OF THE COILED TUBING BY GRINDING A
BEVEL ONTO THE OTHERWISE ANNULAR END OF THE COILED TUBING

206
GRINDING OR OTHERWISE REMOVING A SMALL LONGITUDINAL AMOUNT
OF THE WELD BEAD NEAR THE FREE END OF THE COILED TUBING

208
SELECTING AN ALIGNMENT SLEEVE THAT FITS SNUGLY WITHIN THE COILED TUBING

210
PREPARING THE CONNECTOR FOR CONNECTION TO THE COILED TUBING BY
SLEEVING THE SELECTED ALIGNMENT SLEEVE OVER THE STEM OF THE MAIN
BODY AND SECURING THE ALIGNMENT SLEEVE WITH THE RETAINER NUT

212
DRIVING THE SET SCREWS THROUGH THE RETAINER
NUT TO ENGAGE THE NUT PORTION OF THE STEM

214
INSTALLING THE SET SCREWS BEFORE DRIVING THEM

216
ROTATING THE ALIGNMENT SLEEVE RELATIVE TO THE CONNECTOR AND RELATIVE TO
THE COILED TUBING TO ALIGN THE GROVE IN THE OUTSIDE SURFACE OF THE ALIGNMENT
SLEEVE WITH THE WELD BEAD ON AN INSIDE SURFACE OF THE COILED TUBING

218
INSERTING THE STEM OF THE CONNECTOR, WITH THE ALIGNMENT SLEEVE
AND RETAINER NUT THEREON, INTO THE FREE END OF THE COILED
TUBING SUCH THAT THE GROOVE RECEIVES THE WELD BEAD

220
INSERTING THE STEM OF THE CONNECTOR SUCH THAT THE WELD-ON NECK OF THE MAIN
BODY SLIPS SLIGHTLY WITHIN THE FREE END OF THE COILED TUBING WHERE THE BEVELED
END OF THE COILED TUBING AND THE BEVELED PROXIMAL END OF THE HANDLING PORTION
OF THE MAIN BODY FORM A V-GROOVE AND, OPTIONALLY, WHERE A SMALL LONGITUDINAL
GAP IS MAINTAINED BETWEEN THE TWO BEVELED SURFACES

222
WELDING THE CONNECTOR TO THE COILED TUBING BY CIRCUMFERENTIALLY WELDING

224
WELDING BY WELDING ALONG THE V-GROVE AND PERFORMING ONE PASS OR MULTIPLE PASSES

FIG. 6

COILED TUBING WELD-ON CONNECTOR

CLAIM OF PRIORITY

This patent application claims the benefit of priority to U.S. Provisional Application Ser. No. 63/379,083, filed Oct. 11, 2022, which is incorporated by reference herein in its entirety.

TECHNOLOGICAL FIELD

The present application relates to well intervention systems such as coiled tubing systems. More particularly, the present application relates to connections of bottom hole assemblies, tools, connectors, or other systems to coiled tubing. Still more particularly, the present application relates to welded connections of these systems to a distal end of a coiled tubing system.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Coiled tubing refers generally to continuous flexible piping coiled on a reel or spool. Coiled tubing is significantly faster, relative to conventional interconnected rigid piping, to trip into wellbores or trip out of wellbores. Additionally, coiled tubing can function as either temporary or permanent piping in production wells. As such, coiled tubing is commonly used in both drilling and workover operations at well sites.

Various bottom hole assemblies, connectors, or other systems may be used with coiled tubing depending on the operation being performed. These bottom hole assemblies, connectors, or other systems may be connected to the coiled tubing in one or more ways including, for example, a dimple type, slip type, or weld-on type of connector. The dimple type connector may be suitable in high torque situations while the slip type may be used in high tension, but low torque, situations. The weld-on connector is suitable for all tensile and torque situations. However, heretofore, weld-on connectors may subject the weld to large amounts of stress that can lead to weld failure and the potential for losing a bottom hole assembly, tool, or other system down a well.

US2004/0084191 generally relates to a connector for coiled tubing that resists torque developed by rotating downhole equipment. The connector couples to an inside diameter of the coiled tubing and can use a torque ring that rotationally locks the connector to the coiled tubing. Additionally, the connector can have a slot on an outside diameter thereof adapted to receive a weld bead on the inside diameter of the coiled tubing in order to rotationally lock the connector to the coiled tubing.

US2022/0243539 discloses a connector for connecting a first wellbore tubular to a second wellbore tubular includes a tubular housing connectable to the second tubular and an internal surface facing an internal bore, and a ramp assembly arranged around the surface having a plurality of elongate ramp arrays and a plurality of elongate channels arranged to separate adjacent ramp arrays. The connector includes a slip body which is insertable into the internal bore having an internal surface with at least one slip tooth for engaging the first tubular, an external surface and a ramp assembly arranged around the external surface having a plurality of elongate ramp arrays which grip the first tubular and a plurality of elongate channels arranged to separate adjacent ramp arrays. The ramp arrays of the slip body are each alignable with a respective channel of the tubular housing. The slip body is rotatable within the tubular housing.

SUMMARY

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

In one or more examples, a connector for coiled tubing may include a main body configured for welding to a free end of the coiled tubing and having an internal stem extending distally therefrom. The main body of the connector may include a stem having a sleeve portion. The connector may also include an alignment sleeve arranged on the sleeve portion of the stem and being free to rotate relative to the stem. The alignment sleeve may have a longitudinally extending groove on an outside surface thereof for receiving a longitudinal weld bead on an inside surface of the coiled tubing.

In another example, a method of connecting a connector to a free end of coiled tubing may include aligning a groove in an alignment sleeve of the connector with a weld seam on an inside surface of the coiled tubing. The aligning may include rotating the alignment sleeve relative to the connector and relative to the coiled tubing. The method may also include inserting a portion of the connector with the alignment sleeve thereon, into the free end of the coiled tubing such that the groove receives the weld seam. The method may also include welding the connector to the free end of the coiled tubing.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 6 is a diagram depicting a method of assembling a coiled tubing weld-on connector with coiled tubing, according to one or more examples.

DETAILED DESCRIPTION

The present application, in one or more embodiments, relates to a coiled tubing weld-on connector that extends within a distal end of the coiled tubing while accommodating a wide range of orientations of the coiled tubing's longitudinal weld seam. The connector may, thus, provide for splicing multiple lengths of coiled tubing together with tool assemblies therebetween, while avoiding a need to orient the tubing to accommodate the tool orientation. Moreover, the extension of the connector within the distal end of the coiled tubing may function to distribute bending loads at the weld joint along the length of the tubing thereby reducing the loads on the weld and reducing the risks associated with weld failure.

Figure 1:
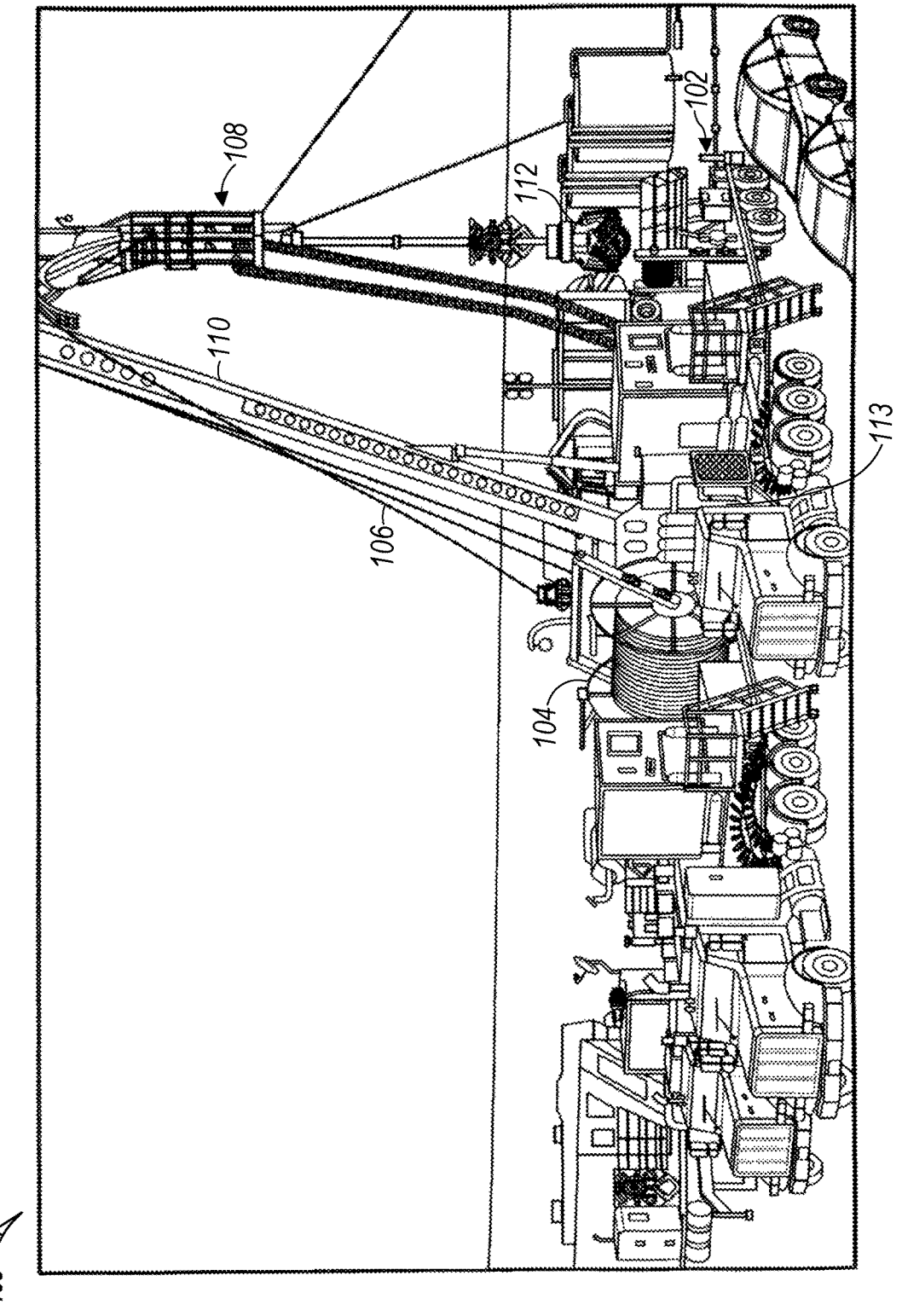
FIG. 1 is a perspective view of a coiled tubing system positioned at a well site and having one or more weld-on connectors attached to the tubing, according to one or more examples.

FIG. 1 illustrates a perspective view of a coiled tubing system 100 in place on a well pad 102, according to one or more examples. As shown in FIG. 1, the coiled tubing system 100 can include a tubing spool 104 containing a high linear footage of coiled tubing 106. The coiled tubing system 100 can include a coiled tubing injector 108. The coiled tubing injector 108 can be operable to advance the coiled tubing 106 into, or withdraw the coiled tubing 106 from, a wellbore of the well pad 102.

In one example, such as shown in FIG. 1, the coiled tubing injector 108 can be suspended above a well bore by a crane 110, such as to help enable the coiled tubing injector 108 to pull the coiled tubing 106 from the tubing spool 104 and lower the coiled tubing 106 into a wellbore. In some examples, the coiled tubing 106 can be connected to various attachments, such as a drilling assembly or other bottom hole assembly 112. In the case of a drilling assembly, the coiled tubing 106 can be connected to a drilling fluid source on the well pad 102 to fluidly power the drilling assembly 112 during a well bore drilling operation. Still other bottom hole assemblies and other attachments to the coiled tubing may be provided. Moreover, in some cases, splices from one length of coiled tubing to another length of coiled tubing may be provided. In many of these cases, the attachment of the bottom hole assembly, tool, or other system may be connected to the coiled tubing with a weld-on connector as described further herein.

Figure 2:
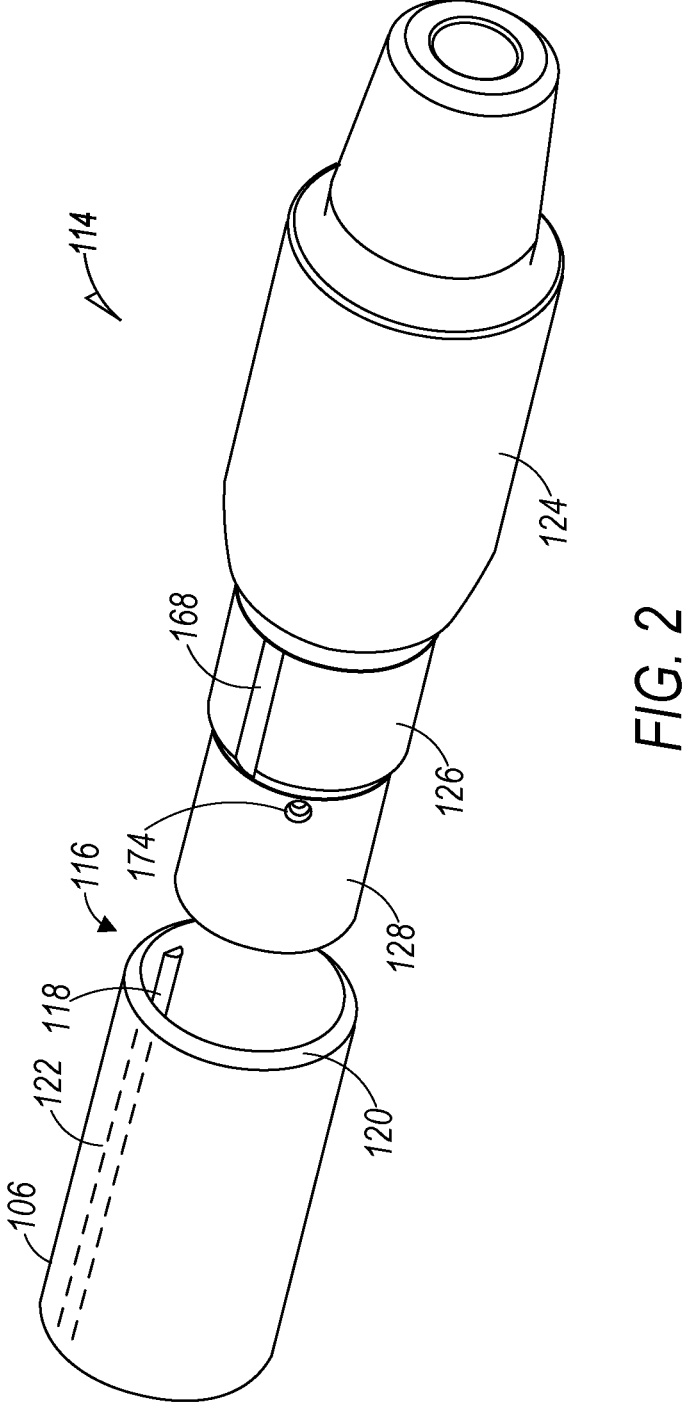
FIG. 2 is a perspective view of a coiled tubing weld-on connector poised for insertion into a distal end of coiled tubing, according to one or more examples.

FIG. 2 shows a perspective view of a coiled tubing weld-on connector 114 poised for insertion into a distal or other free end 116 of coiled tubing, according to one or more examples. Such a connector 114 may be adapted for connecting a bottom hole assembly, making a splice connection, or otherwise adapting a free end 116 of coiled tubing for use with particular tools or for connection to another length of coiled tubing. As shown, the coiled tubing 106 may be a generally slender cylindrically shaped tube with an inner diameter and an outer diameter. The manufacturing of the tubing 106 may commonly result in a longitudinally extending weld seam 122 that creates an inwardly protruding weld bead 118 on an inside surface of the coiled tubing 106. In preparation for attaching a weld-on connector 114 to the coiled tubing 106, field personnel may cut the coiled tubing 106 to create the free end 116 shown. In addition, the field personnel may grind a bevel 120 onto the otherwise annular surface of the free end 116 of the tubing 106. Field personnel may also grind or otherwise remove a small amount of the weld bead 118 within the end of the coiled tubing to allow the coiled tubing to receive a neck of the connector 114 within the end of the coiled tubing without being inhibited by the weld bead. For example, as shown, a ⅝ inch or ⅝ inch of the weld bead 118 measured along the length of the tubing may be removed.

Figure 3:
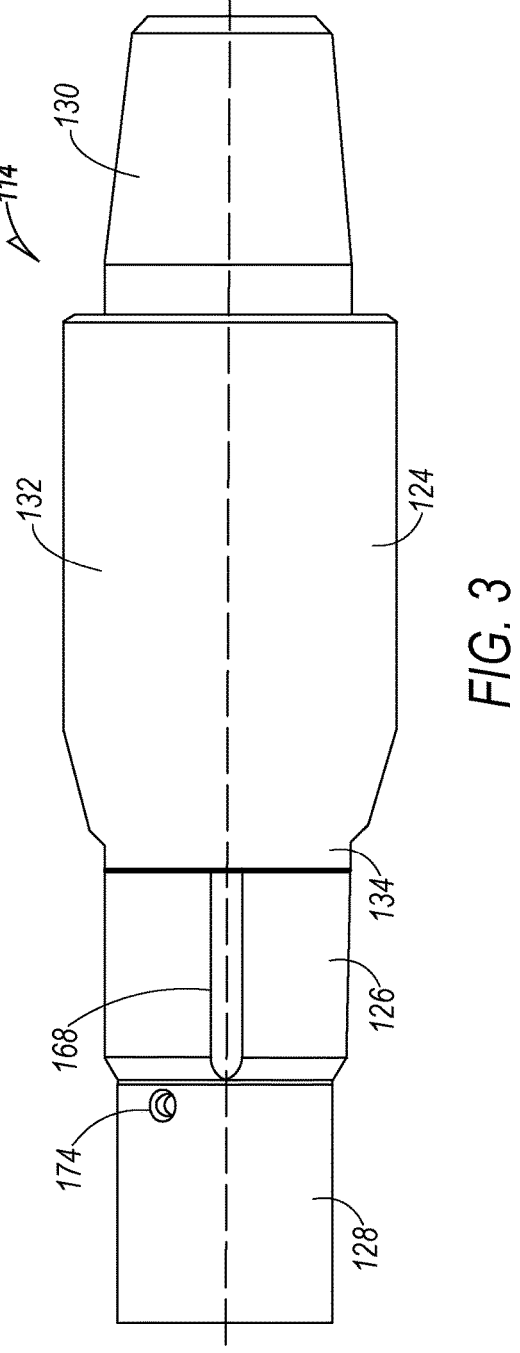
FIG. 3 is a side view of the weld-on connector of FIG. 2, according to one or more examples.
Figure 4:
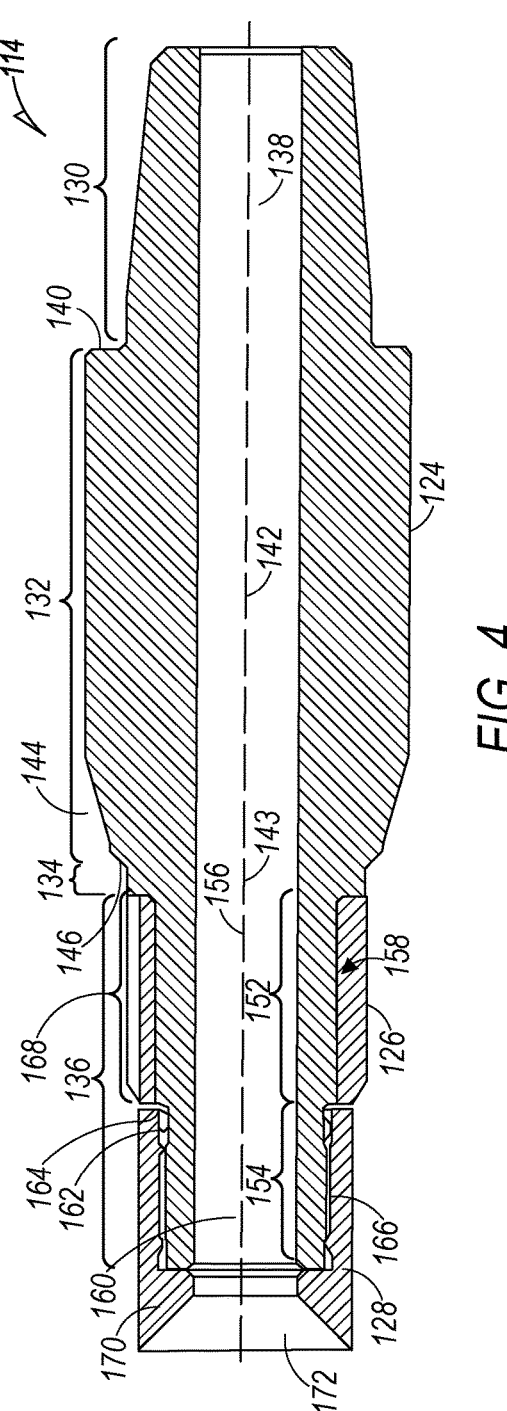
FIG. 4 is cross-section view thereof.

With continued reference to FIG. 2 and now with reference to FIGS. 3 and 4 as well, a weld-on connector 114 is shown. The weld-on connector 114 may be adapted for welding to a free end 116 of coiled tubing 106 and for stabbing into and threadably engaging a bottom hole assembly, a quick connector, a tool, or other attachable items. As shown, the weld-on connector 114 may include a main body 124, an alignment sleeve 126, and a retainer nut 128.

Portions of the main body 124 can be seen in FIGS. 2 and 3. FIG. 4 shows the connector in cross-section and also shows portions of the main body that extend within the alignment sleeve 126 and the retainer nut 128. The main body 124 may be configured for stabbing into and threadably engaging other elements or devices along the drill string. The main body 124 may also be configured for grasping by a torquing tool such as an iron roughneck or other torquing device. Still further the main body 124 may be configured for welding to a free end 116 of coiled tubing 106 and for supporting the alignment sleeve 126 and the retainer nut 128 within the coiled tubing 106. As shown, the main body 124 may include a stabbing tip 130, a handling collar 132, a weld-on neck 134, and an internal stem 136.

The stabbing tip 130 may extend from a distal end of the handling collar 132 and may be a tapered and threaded tip adapted for stabbing into and threadably engaging an adjacent element within the downhole string. For example, the stabbing tip 130 may threadably engage a bottom hole assembly or a quick connector, for example. The stabbing tip 130 may include an internal bore 138 with an inner diameter and an outer tapered surface with a varying diameter creating the taper. Threads may be arranged along the outer surface for engaging threads on a receiver of the adjacent element.

The handling collar 132 may be arranged proximal to or immediately proximal to the stabbing tip 130 and may be configured for handling of the connector 114 and for spinning and torquing the connector 114 to secure it to an adjacent element connected with the stabbing tip 130. The handling collar 132 may have a diameter larger than the stabbing tip 130 and may include a torquing shoulder 140 where the stabbing tip 130 extends from the handling collar 132. The shoulder may provide a stop for the adjacent element when threadably engaging the stabbing tip 130. The handling collar 132 may include a generally cylindrical outer surface and an internal bore 142 having an inner diameter that is the same or similar to that of the stabbing tip 130. The cylindrical outer surface may provide for engagement by a torquing tool such as an iron roughneck or other torquing device. As shown, the handling collar 132 may have a tapered proximal end 144 and a beveled edge 146 proximal of the tapered proximal end 144.

Figure 5:
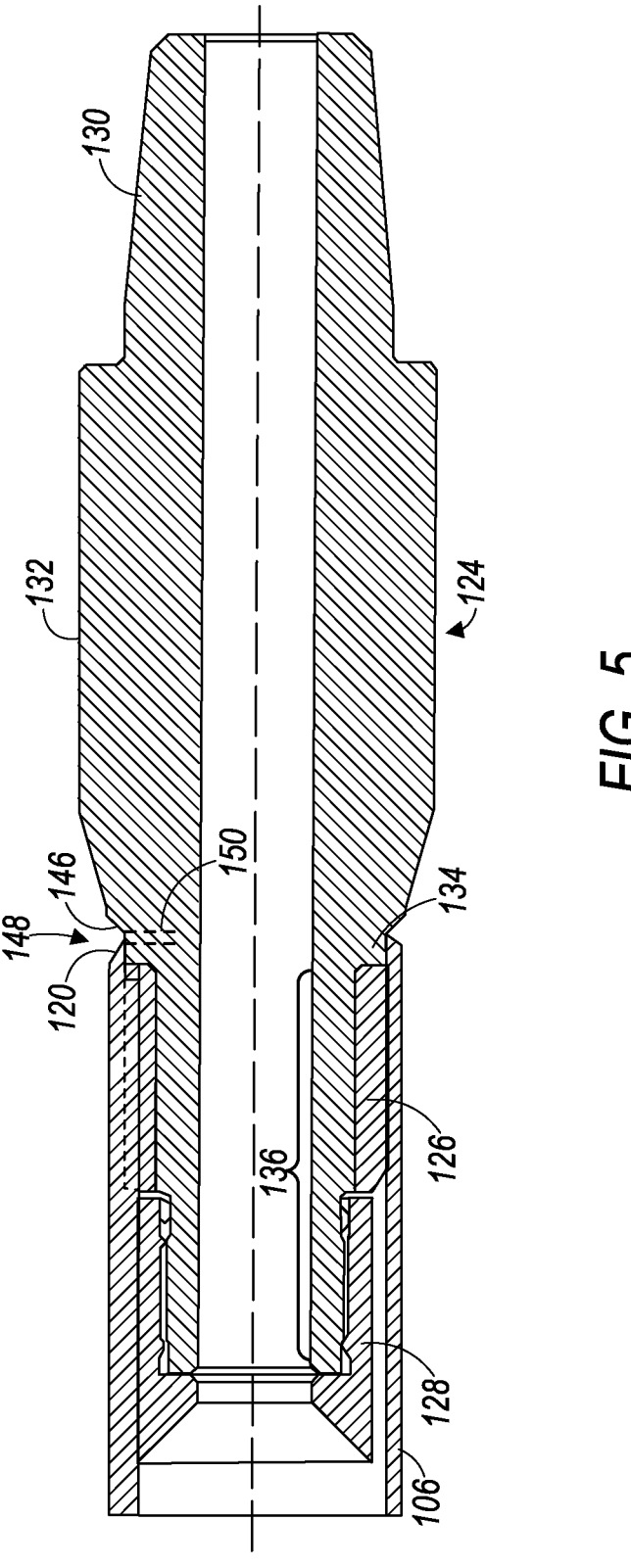
FIG. 5 is a cross-section of the weld-on connector positioned in a free end of the coiled tubing, according to one or more examples.

The weld-on neck 134 may extend from a proximal end of the handling collar 132 (e.g., opposite the stabbing tip 130). The weld-on neck 134 may be configured for slipping slightly within the free end 116 of the coiled tubing 106 and for providing a backer for a welded connection between the beveled end 120 of the coiled tubing 106 and the beveled edge 146 at the proximal end of the handling collar 132. That is, and as shown in FIG. 5, when the connector 114 is positioned within the free end 116 of the coiled tubing 106 the beveled end 120 of the tubing 106 may pass over the weld-on neck 134 slightly and may be positioned closely to the beveled edge 146 of the handling collar 132 creating a circumferential V-groove 148 extending around the circumference of the weld-on neck 134. A slight gap 150 between the beveled end 120 of the coiled tubing 106 and the beveled edge 146 of the handling collar 132 may be provided where the outer surface of the weld-on neck 134 provides a generally flat bottom of the V-groove 148 when viewed in cross-section. The weld-on neck 134 may extend within the coiled tubing 106 a distance ranging from approximately ⅛ inch to approximately ½ inch or from approximately 3/16 inch to approximately 5/16 inch, or approximately ¼ inch.

The internal stem 136 may extend proximally from the weld-on neck 134. The internal stem 136 may be configured for supporting the alignment sleeve 126 and the retainer nut 128 within the coiled tubing 106. As such, the internal stem 136 may include a sleeve portion 152 and a nut portion 154. As shown in FIG. 4, the sleeve portion 152 may include a generally cylindrical element extending proximally from the proximal end of the weld-on neck 134. The sleeve portion 152 may have a length selected to accommodate the length of the alignment sleeve 126. The sleeve portion 152 may include an internal bore 156 in alignment with the internal bores 143, 142, 138 of the weld-on neck 134, the handling collar 132, and the stabbing tip 130, respectively. The internal bore 156 in the sleeve portion 152 may also be the same or similar size as the internal bores 143, 142, 138 of the other portions. The sleeve portion 152 may have a generally smooth outer circumferential surface 158 adapted to allow the alignment sleeve 126 to rotate substantially freely about the sleeve portion 152. The nut portion 154 may extend further proximal from the proximal end of the sleeve portion 152. Like the sleeve portion 154, the nut portion 152 may have an internal bore 160 sized the same as and in alignment with the bores 156, 143, 142, 138 of the several other portions of the main body 124. As such, an internal bore with a substantially constant diameter may extend fully through the length of the main body 124. The nut portion 154 may have a cylindrical outer surface 162, which may be slightly smaller in diameter than the sleeve portion 152, creating a seat 164 for the distal end of the nut 128 arranged on the nut portion 154. The nut portion 154 may have threads 166 on the cylindrical outer surface 162 for threadable engagement by the retainer nut 128.

The alignment sleeve 126 is shown in each of FIGS. 2-5. The alignment sleeve 126 may be positioned on the sleeve portion 152 of the stem 136 of the main body 124 and may be adapted for rotate freely relative to the main body 124. For example, the alignment sleeve 126 may have an inner diameter that is slightly larger than the sleeve portion 152 of the stem 136 of the main body 124 allowing the alignment sleeve to rotate when placed on the sleeve portion. In one or more examples, the inner diameter of the alignment sleeve 126 may be only slightly larger than the sleeve portion 152 and lubrication may be provided on the sleeve portion 152 to allow the alignment sleeve 126 to rotate relatively freely. The outer diameter of the alignment sleeve 126 may be selected to provide for a snug fit within the coiled tubing 106. In one or more examples, the connector 114 may include one or more alignment sleeves 126 for various different sizes of coiled tubing 106 and/or one or more alignment sleeves 126 for a particular size of coiled tubing 106 where each of the one or more alignment sleeves 126 has a slightly different outer diameter to accommodate various tolerances of the inner diameter of the coiled tubing 106. Lubrication may also be provided on an outside surface of the alignment sleeve 126 and/or on the inside surface of the coiled tubing 106 to allow the snug fitting alignment sleeve 126 to be slipped into the free end 116 of the coiled tubing 106. The alignment sleeve 126 may have a length the same as or slightly smaller than the sleeve portion 152 of the stem 136 of the main body 124 such that the distal and proximal surfaces of the alignment sleeve 126 avoid pinching between the retainer nut 128 and the proximal face of the weld-on neck 134. In one or more examples, the alignment sleeve 126 may include a beveled proximal end.

The alignment sleeve 126 may include a longitudinally extending groove 168 on the outside surface of the alignment sleeve 126. The groove 168 may be adapted to receive the weld bead 118 extending longitudinally along the inside surface of the coiled tubing 106 and the free rotation of the alignment sleeve 126 may provide for aligning the groove 168 with the weld bead 118. For example, where the connector 114 is stabbed into a bottom hole assembly or other tool assembly and, as such, is difficult to rotate when the coiled tubing weld seam 122 is not aligned with the groove 168 in the alignment sleeve 126, the sleeve 126 may be rotated to align the groove 168 with the weld seam 122 such that the connector 116 may be inserted into the free end 116 of the coiled tubing 106 without being inhibited by the weld bead 118. In one or more examples, the groove 168 may extend radially approximately ½ way through the thickness of the alignment sleeve 126 providing a bottom of the groove that is approximately equal to an outer diameter of the retainer nut 128. Still other depths of the groove 168 may be provided.

The retainer nut 128 may be configured for threadingly engaging the nut portion 154 of the stem 136 of the main body 124 and for retaining the alignment sleeve 126 on the sleeve portion 152. As shown, the retainer nut 128 may be a substantially cylindrical nut with a threaded inner bore sized and adapted to engage the threads 166 on the outside surface 162 of the nut portion 154 of the stem 136 of the main body 124. The nut 128 may have an outer diameter adapted to remain generally clear of the inside surface of the coiled tubing and, as such, may have a dimeter smaller than the outside diameter of the alignment sleeve 126. The nut 128 may include a stopping cap 170 configured to arrest distal motion of the nut 128 when a particular amount of threaded engagement has occurred. For example, as shown in FIGS. 4 and 5, when the nut 128 is threaded onto the nut portion 154, the stopping cap 170 may engage a proximal end of the nut portion 154 before the distal end of the nut 128 engages the proximal end of the sleeve portion 152. This may assist in avoiding seizing of the alignment sleeve 126 by maintaining the distal end of the nut 128 clear of the proximal end of the alignment sleeve 126. The stopping cap 170 may also include a flow funnel 172 on a proximal face thereof that provides a transition from the larger bore of the coiled tubing 106 to the smaller internal bore of the main body 124. As shown, the flow funnel 172 may include a generally conical bore have a relatively larger diameter at a proximal side of the cap 170 and a relatively smaller diameter at the distal side of the cap 170. As shown in FIGS. 2 and 3, the retainer nut 128 may also include one or more set screws 174 extending generally radially inward through corresponding threaded bores extending through the wall of the retainer nut 128. The screws and their respective bores may be arranged near a distal end of the retainer nut 128 so as to imping on the nut portion 154 of the stem 136 of the main body 124 at a location distal to the threads 166 of the nut portion 154. The length of the set screws 174 may be selected such that excessive backing out of the set screws 174 is prevented by the internal wall of the coiled tubing 106. That is, were the set screws 174 to back out of the bores when the stem 136 of the connector 114 is arranged within the coiled tubing 106, the head of the set screw 174 would engage the internal wall of the coiled tubing 106 before the tip of the set screw 174 would clear the threads 166 on the nut portion 154 of the stem 136. That way, even if the set screws 174 were to come loose, the retainer nut 128 would still be prevented from sliding off the proximal end of the nut portion 154 of the stem 136 of the main body 124.

It is to be appreciated that while a retainer nut 128 has been shown and described, other systems and devices for retaining the alignment sleeve 126 may be provided. For example, the alignment sleeve 126 may include its own set of set screws that may engage the sleeve portion 152 of the stem 136 and/or a groove in the sleeve portion 152 of the stem 136. The set screws may be arranged near a distal end of the alignment sleeve 126 such the alignment sleeve 126 may be aligned and partially inserted into the coiled tubing 106 before driving the set screws. Like the set screws of the retainer nut 128, the set screws may have a length preventing them from backing out of the alignment sleeve 126 when the sleeve 126 is within the coiled tubing 106. In other examples, retainer rings or other retaining devices may be provided.

FIG. 5 is a cross-section through the connector 114 and a free end 116 of coiled tubing 106 with the stem 136 of the connector 114 arranged within the free end 116. It is to be appreciate that the cross-section is taken through the longitudinally extending weld 122 of the coiled tubing 106 and, as such, the weld 122 is shown positioned in the groove 168 of the alignment sleeve 126. Moreover, there is less space between the retainer nut 128 and the longitudinal coiled tubing weld 122 (top side of nut in FIG. 5) than between the retainer nut 128 and the inner wall of the coiled tubing (bottom side of nut in FIG. 5). As also shown, the beveled end 120 of the coiled tubing 106 is slipped over the weld-on neck 134 and the beveled end 120 of the coiled tubing 106 creates a V-groove 148 in conjunction with the beveled proximal end 146 of the handling portion 132 of the main body 124.

The presently described weld-on connector 114 may provide several advantages. For example, the alignment sleeve 126 extending within the coiled tubing 106 may help to align the longitudinal axis of the connector 114 with the longitudinal axis of the coiled tubing 106 during welding such that the connector 114 is connected in proper alignment with the coiled tubing 106. Still further, the relatively snug fit of the alignment sleeve 126 within the coiled tubing 106 may assist in distributing out of plane bending forces on the weld joint along the length of the coiled tubing thereby reducing the bending forces sustained by the welded connection between the coiled tubing 106 and the connector 114. Still further, this alignment sleeve 126 may be provided while avoiding grind out the longitudinal weld bead 118 for the full length of the sleeve 126 because the groove 168 in the alignment sleeve 126 may receive the weld bead 118. Still further, the free rotation of the alignment sleeve 126 allows for the connection to be made when the connector and/or the tools or assemblies it is attached to are not able to be rotated or are not easily rotated to align with the longitudinal weld 122 of the coiled tubing 106. Accordingly, the present connector improves the weld connection between the weld-on connector 114 and the coiled tubing

106 while accommodating difficulties associated with rotational orientation of the connector 114 and the coiled tubing 106.

In operation and use a method 200 of attaching a weld-on connector to a free end of coiled tubing may be provided. The method may include cutting the coiled tubing to create a free end 202. The method may also include preparing the free end of the coiled tubing by grinding a bevel onto the otherwise annular end of the coiled tubing 204. The method may also include grinding or otherwise removing a small longitudinal amount of the weld bead near the free end of the coiled tubing 206. The method may also include selecting an alignment sleeve that fits snugly within the coiled tubing 208. This may involve slipping one or more alignment sleeves within the free end of the coiled tubing to see which one fits the most snug while allowing insertion within the free end of the coiled tubing. The method may also include preparing the connector for connection to the coiled tubing by sleeving the selected alignment sleeve over the stem of the main body and securing the alignment sleeve with the retainer nut 210. The method may also include driving the set screws through the retainer nut to engage the nut portion of the stem 212. In one or more examples, the method may include installing the set screws before driving them 214. In preparation for inserting the connector into the free end of the coiled tubing, the method may include rotating the alignment sleeve relative to the connector and relative to the coiled tubing to align the groove in the outside surface of the alignment sleeve with the weld bead on an inside surface of the coiled tubing 216. The method may also include inserting the stem of the connector, with the alignment sleeve and retainer nut thereon, into the free end of the coiled tubing 218. The connector may be inserted such that the weld-on neck of the main body slips slightly within the free end of the coiled tubing where the beveled end of the coiled tubing and the beveled proximal end of the handling portion of the main body form a V-groove 220. In one or more examples, a small longitudinal gap may be maintained between the two beveled surfaces. The method may also include welding the connector to the coiled tubing by circumferentially welding along the V-groove 222. The welding may include one pass or multiple passes to fill the V-groove and provide a complete penetration weld 224.

The present method may be advantageous by allowing for connection of the coiled tubing to a wide variety of tools and/or systems where, for example, rotation of the tools and/or systems is difficult while also providing for a reliable connection that avoids exposing the welded connection to excessive loading. In one example, the method may be used to connect coiled tubing to another length of coiled tubing with a quick connect. For example, a connector such as the one described, but oriented with its proximal end and distal end reversed, may be fitted to a proximal end of a length of coiled tubing that may be downhole, for example. The connector may be stabbed into a quick connected fitting and torqued. Another connector as described herein may be stabbed into the other end of the quick connect fitting and torqued. Then, with little to no ability to rotate the coiled tubing that is down hole, each connector may be slipped into free ends of the respective free ends of the coiled tubing by aligning the respective alignment sleeves with the weld bead on the inside surface of the respective free ends of coiled tubing. The alignment sleeves of the respective connectors may help to align the connectors with the respective free ends of the coiled tubing and may assist with holding the connectors in alignment during welding. While both connectors were said to be inserted and then welded, one connector may be inserted and welded followed by insertion of the other connector into the other free end and welded.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A connector for coiled tubing, comprising:
   a main body having a weld-on neck configured for welding to a free end of the coiled tubing and having an internal stem extending distally from the weld-on neck to a proximal end, the stem having a sleeve portion and a nut portion proximal of the sleeve portion;
   an alignment sleeve arranged on the sleeve portion of the stem and having a longitudinal length and a longitudinally extending groove on an outside surface thereof for receiving a longitudinal weld bead on an inside surface of the coiled tubing; and a retainer nut arranged on the nut portion and configured to retain the alignment sleeve, wherein the alignment sleeve is configured for free rotation relative to the stem and the retainer nut to align the longitudinally extending groove with the longitudinal weld bead, and wherein the retainer nut comprises a stopping cap configured to engage the proximal end of the stem and arrest distal motion of the retainer nut and establish a distance between a distal end of the retainer nut to the weld-on neck that exceeds the length of the alignment sleeve maintaining the distal end of the retainer nut clear of a proximal end of the alignment sleeve.

2. The connector of claim 1, wherein the main body comprises a weld-on neck arranged on a proximal end of the main body and configured for insertion into a free end of the coiled tubing, the stem extending distally from the weld-on neck.

3. The connector of claim 2, wherein the weld-on neck extends from the proximal end of the main body at a bevel, the bevel configured to form a groove with another bevel on the free end of the coiled tubing when the weld-on neck is inserted into the free end.

4. The connector of claim 1, wherein the longitudinally extending groove has a bottom defining a diameter.

5. The connector of claim 4, wherein the retainer nut has an outer diameter approximately equal to the diameter defined by the bottom of the longitudinally extending groove.

6. The connector of claim 5, wherein the retainer nut threadably engages the nut portion of the stem.

7. The connector of claim 6, further comprising a set screw configured to impinge on the nut portion of the stem.

8. The connector of claim 7, wherein the set screw has a length selected to prevent backing out of the set screw when the stem of the connector is arranged within the coiled tubing.

9. The connector of claim 1, wherein the alignment sleeve is configured for a snug fit within the free end of the coiled tubing.

10. The connector of claim 9, further comprising additional alignment sleeves each with a different outer diameter that are selectable and interchangeable with the alignment sleeve allowing for selection of the alignment sleeve from the additional alignment sleeves.

11. The connector of claim 1, wherein the main body comprises a stabbing tip extending from a distal end thereof.

12. The connector of claim 11, wherein the main body comprises a handling collar arranged between the weld-on neck and the stabbing tip.

13. The connector of claim 12, wherein a distal end of the handling collar comprises a shoulder for arresting relative proximal motion of an adjacent element threadably engaging the stabbing tip.

14. A method of connecting a connector to a free end of coiled tubing, the method comprising:
   aligning a groove in an alignment sleeve with a weld seam on an inside surface of the coiled tubing, the aligning comprising rotating the alignment sleeve relative to the connector and relative to the coiled tubing;
   inserting a portion of the connector with the alignment sleeve thereon, into the free end of the coiled tubing such that the groove receives the weld seam; and
   welding the connector to the free end of the coiled tubing.

15. The method of claim 14, wherein inserting further comprises inserting a weld-on neck of the connector slightly within the free end of the coiled tubing.

16. The method of claim 15, wherein the free end of the coiled tubing comprises a first beveled end and the connector comprises a second beveled end distal of the weld-on neck and the first and second beveled ends form a V-groove.

17. The method of claim 14, further comprising selecting the alignment sleeve from multiple alignment sleeves by choosing one of the multiple alignment sleeves with a snug fit in the free end of the coiled tubing and assembling the connector to include the selected alignment sleeve.

18. The method of claim 17, wherein assembling the connector comprises slipping the selected alignment sleeve over a stem of the connector and securing the alignment sleeve with a retainer nut.

19. The method of claim 18, further comprising securing the retainer nut with a set screw.

\* \* \* \* \*